US009557932B1

(12) United States Patent
Chopra et al.

(10) Patent No.: US 9,557,932 B1
(45) Date of Patent: Jan. 31, 2017

(54) METHOD AND SYSTEM FOR DISCOVERING SNAPSHOT INFORMATION BASED ON STORAGE ARRAYS

(71) Applicant: EMC Corporation, Hopkinton, MA (US)

(72) Inventors: Shelesh Chopra, Bangalore (IN); John C. Rokicki, Hopkinton, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 58 days.

(21) Appl. No.: 14/090,937

(22) Filed: Nov. 26, 2013

(51) Int. Cl.
*G06F 12/16* (2006.01)
*G06F 3/06* (2006.01)
*G06F 12/14* (2006.01)
*G06F 11/14* (2006.01)
*G06F 12/10* (2016.01)

(52) U.S. Cl.
CPC .......... *G06F 3/065* (2013.01); *G06F 3/0614* (2013.01); *G06F 3/0683* (2013.01); *G06F 11/1446* (2013.01); *G06F 11/1448* (2013.01); *G06F 11/1464* (2013.01); *G06F 12/14* (2013.01); *G06F 12/1458* (2013.01); *G06F 12/10* (2013.01)

(58) Field of Classification Search
CPC ............ G06F 12/12464; G06F 11/2056; G06F 11/1446; G06F 11/1448; G06F 11/1458; G06F 11/1464
USPC ................................................. 711/161, 162
See application file for complete search history.

(56) References Cited

U.S. PATENT DOCUMENTS

| 2007/0006018 | A1* | 1/2007 | Thompson et al. .............. 714/6 |
| 2009/0055822 | A1* | 2/2009 | Tolman et al. .................... 718/1 |
| 2009/0307449 | A1* | 12/2009 | Prahlad et al. ............... 711/162 |
| 2009/0319582 | A1* | 12/2009 | Simek et al. .................. 707/204 |
| 2011/0167234 | A1* | 7/2011 | Nishibori et al. ............. 711/162 |
| 2011/0251992 | A1* | 10/2011 | Bethlehem et al. .......... 707/610 |
| 2012/0089798 | A1* | 4/2012 | Prahlad et al. ............... 711/162 |
| 2012/0179886 | A1* | 7/2012 | Prahlad et al. ............... 711/162 |
| 2013/0238872 | A1* | 9/2013 | Prahlad et al. ............... 711/162 |
| 2014/0101113 | A1* | 4/2014 | Zhang et al. ................. 707/692 |
| 2014/0115285 | A1* | 4/2014 | Arcese et al. ................ 711/162 |

* cited by examiner

*Primary Examiner* — Than Nguyen
(74) *Attorney, Agent, or Firm* — Dergosits & Noah LLP; Todd A. Noah

(57) ABSTRACT

Discovering snapshot information based on storage arrays is described. A system identifies first snapshot information associated with a first storage array. The system identifies second snapshot information associated with a second storage array. The system outputs the first snapshot information and the second snapshot information via a user interface.

20 Claims, 5 Drawing Sheets

| Source Host Name 502 | File System 504 | Mount Host 506 | Array Name: Array Identifier 508 | Array Model 510 | Snapshot Type 512 | Number of Snapshots 514 | LUN Identifier Source: Target 516 | Creation Type 518 |
|---|---|---|---|---|---|---|---|---|
| AA | /FS1 | BBB | Abc:11111 | VNX-5700 | SNAP | 10 | 111:222<br>111:333<br>111:444 | MANAGED<br>FOREIGN<br>MANAGED |
| AA | /FS2 | BBB | Abc:11111 | VNX-5700 | CLONE | 1 | XXX:YYY | FOREIGN |
| AA | /FS2 | BBB | Abc:11111 | VNX-5700 | CLONE | 10 | 202:303<br>203:304 | FOREIGN<br>FOREIGN |
| CC | /FS3 | CCC | Abc:11111 | VNX-5700 | VNX-SNAPS | 10 | 123:345 | MANAGED |
| CC | /FS3 | CCC | XXX:2222 | VMAX | MIRROR | 2 | 444:555 | MANAGED |
| DD | /FS4 | CCC | YYY:3333 | VMAX | VDEV | 2 | 666:777 | FOREIGN |
| DD | /FS5 | CCC | ZZZ:44444 | RecoverPoint 3.5 | CDP | 2 | REP SET:XXX | FOREIGN |

FIG. 5

METHOD AND SYSTEM FOR DISCOVERING SNAPSHOT INFORMATION BASED ON STORAGE ARRAYS

BACKGROUND

If a software error corrupts a database, or if erroneous data updates the database, a database administrator may restore the database to a previous uncorrupted state that does not include the corrupted or erroneous data. A backup application executes a backup operation either occasionally or continuously to enable this restoration, storing a copy of each desired database state (the values of its data and these values' embedding in the database's data structures) within dedicated backup files. When the database administrator decides to return the database to a previous state, the database administrator specifies the desired previous state by identifying a desired point in time when the database was in this state, and instructs the backup application to execute a restore operation to restore a copy of the corresponding backup files for that state to the database.

A snapshot is the capture of the state of a computer system object, such as a database, at a specific moment in time. A backup application may store snapshots on a storage array, which is a disk storage system which contains multiple disk drives. Unlike a disk enclosure, a storage array has cache memory and advanced functionality, such as virtualization and Redundant Array of Independent Disks (RAID). An enterprise may have a backup administrator to manage a backup application to create snapshots of computer system objects, use multiple storage arrays to store snapshots of computer system objects, and have multiple storage administrators managing the multiple storage arrays.

BRIEF DESCRIPTION OF THE DRAWINGS

Advantages of the subject matter claimed will become apparent to those skilled in the art upon reading this description in conjunction with the accompanying drawings, in which like reference numerals have been used to designate like elements, and in which:

FIG. 5 is yet another screen shot illustrating a frame of an example user interface screen of a display device supporting methods for discovering snapshot information based on storage arrays, under an embodiment.

DETAILED DESCRIPTION

An administrator of an enterprise's computer system may need all of the information about the snapshots that are stored on the enterprise's storage arrays to help meet service level objectives, such as recovery point objectives and recovery time objectives. However, the usability and intuitiveness of snapshot technologies is still a challenge for end users due to inconsistent terminology and cumbersome solutions encompassing the entire backup, storage, and application environments. For example, a storage administrator may be able to discover information about snapshots corresponding to a specific source that are stored on storage arrays managed by the storage administrator, but have no information about the snapshots corresponding to the same source that are stored on storage arrays managed by other storage administrators. Further to this example, a backup administrator may not be able to discover array-based information about snapshots corresponding to the specific source that are stored on specific storage arrays of the enterprise because the backup application may provide only a very abstracted view of the storage subsystem used to store snapshots.

Embodiments herein provide discovering of snapshot information based on storage arrays. A system identifies first snapshot information associated with a first storage array. For example, an array profiler executes the application program interface for a VNX-5700 storage array to discover the array model, array names, array identifiers, snapshot types, number of snapshots, and logical unit identifiers for the source and the target for snapshots stored on the VNX-5700 storage array. The system identifies second snapshot information associated with a second storage array. For example, the array profiler executes the application program interface for a VMAX storage array to discover the array model, array names, array identifiers, snapshot types, number of snapshots, and logical unit identifiers for the source and the target for snapshots stored on the VMAX storage array. The system outputs the first snapshot information and the second snapshot information via a user interface. For example, a user interface outputs the array models, array names, array identifiers, snapshot types, number of snapshots, and logical unit identifiers for the source and the target for snapshots stored on the VNX-5700 and VMAX storage arrays. The array profiler creates and enables the display a hybrid view of the storage administrators' views of snapshots stored on storage arrays, the backup administrator's view of snapshots stored on storage arrays, and additional information linking the storage administrators' views of snapshots stored on storage arrays with the backup administrator's view of snapshots stored on storage arrays.

Figure 1:
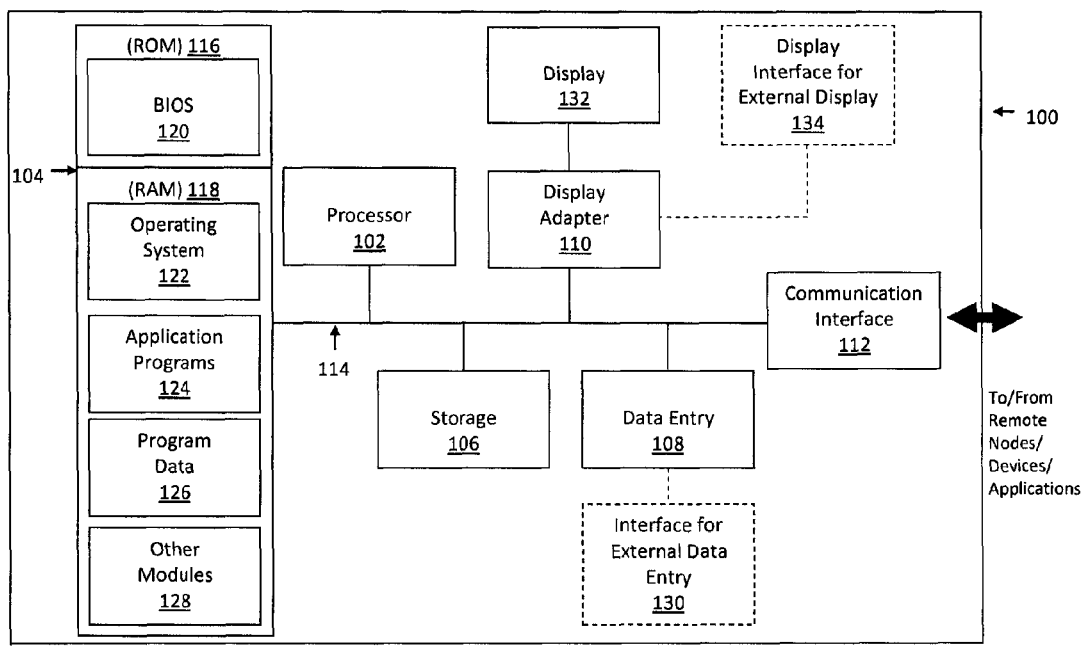
FIG. 1 is a block diagram illustrating an example hardware device in which the subject matter may be implemented.

Prior to describing the subject matter in detail, an exemplary hardware device in which the subject matter may be implemented shall first be described. Those of ordinary skill in the art will appreciate that the elements illustrated in FIG. 1 may vary depending on the system implementation. With reference to FIG. 1, an exemplary system for implementing the subject matter disclosed herein includes a hardware device 100, including a processing unit 102, memory 104, storage 106, data entry module 108, display adapter 110, communication interface 112, and a bus 114 that couples elements 104-112 to the processing unit 102.

The bus 114 may comprise any type of bus architecture. Examples include a memory bus, a peripheral bus, a local bus, etc. The processing unit 102 is an instruction execution machine, apparatus, or device and may comprise a microprocessor, a digital signal processor, a graphics processing unit, an application specific integrated circuit (ASIC), a field programmable gate array (FPGA), etc. The processing unit 102 may be configured to execute program instructions stored in memory 104 and/or storage 106 and/or received via data entry module 108.

The memory 104 may include read only memory (ROM) 116 and random access memory (RAM) 118. Memory 104 may be configured to store program instructions and data during operation of device 100. In various embodiments, memory 104 may include any of a variety of memory technologies such as static random access memory (SRAM) or dynamic RAM (DRAM), including variants such as dual data rate synchronous DRAM (DDR SDRAM), error correcting code synchronous DRAM (ECC SDRAM), or RAMBUS DRAM (RDRAM), for example. Memory 104 may also include nonvolatile memory technologies such as nonvolatile flash RAM (NVRAM) or ROM. In some embodiments, it is contemplated that memory 104 may include a combination of technologies such as the foregoing, as well as other technologies not specifically mentioned. When the subject matter is implemented in a computer system, a basic input/output system (BIOS) 120, containing the basic routines that help to transfer information between elements within the computer system, such as during start-up, is stored in ROM 116.

The storage 106 may include a flash memory data storage device for reading from and writing to flash memory, a hard disk drive for reading from and writing to a hard disk, a magnetic disk drive for reading from or writing to a removable magnetic disk, and/or an optical disk drive for reading from or writing to a removable optical disk such as a CD ROM, DVD or other optical media. The drives and their associated computer-readable media provide nonvolatile storage of computer readable instructions, data structures, program modules and other data for the hardware device 100.

It is noted that the methods described herein can be embodied in executable instructions stored in a computer readable medium for use by or in connection with an instruction execution machine, apparatus, or device, such as a computer-based or processor-containing machine, apparatus, or device. It will be appreciated by those skilled in the art that for some embodiments, other types of computer readable media may be used which can store data that is accessible by a computer, such as magnetic cassettes, flash memory cards, digital video disks, Bernoulli cartridges, RAM, ROM, and the like may also be used in the exemplary operating environment. As used here, a "computer-readable medium" can include one or more of any suitable media for storing the executable instructions of a computer program in one or more of an electronic, magnetic, optical, and electromagnetic format, such that the instruction execution machine, system, apparatus, or device can read (or fetch) the instructions from the computer readable medium and execute the instructions for carrying out the described methods. A non-exhaustive list of conventional exemplary computer readable medium includes: a portable computer diskette; a RAM; a ROM; an erasable programmable read only memory (EPROM or flash memory); optical storage devices, including a portable compact disc (CD), a portable digital video disc (DVD), a high definition DVD (HD-DVD™), a BLU-RAY disc; and the like.

A number of program modules may be stored on the storage 106, ROM 116 or RAM 118, including an operating system 122, one or more applications programs 124, program data 126, and other program modules 128. A user may enter commands and information into the hardware device 100 through data entry module 108. Data entry module 108 may include mechanisms such as a keyboard, a touch screen, a pointing device, etc. Other external input devices (not shown) are connected to the hardware device 100 via external data entry interface 130. By way of example and not limitation, external input devices may include a microphone, joystick, game pad, satellite dish, scanner, or the like. In some embodiments, external input devices may include video or audio input devices such as a video camera, a still camera, etc. Data entry module 108 may be configured to receive input from one or more users of device 100 and to deliver such input to processing unit 102 and/or memory 104 via bus 114.

A display 132 is also connected to the bus 114 via display adapter 110. Display 132 may be configured to display output of device 100 to one or more users. In some embodiments, a given device such as a touch screen, for example, may function as both data entry module 108 and display 132. External display devices may also be connected to the bus 114 via external display interface 134. Other peripheral output devices, not shown, such as speakers and printers, may be connected to the hardware device 100.

The hardware device 100 may operate in a networked environment using logical connections to one or more remote nodes (not shown) via communication interface 112. The remote node may be another computer, a server, a router, a peer device or other common network node, and typically includes many or all of the elements described above relative to the hardware device 100. The communication interface 112 may interface with a wireless network and/or a wired network. Examples of wireless networks include, for example, a BLUETOOTH network, a wireless personal area network, a wireless 802.11 local area network (LAN), and/or wireless telephony network (e.g., a cellular, PCS, or GSM network). Examples of wired networks include, for example, a LAN, a fiber optic network, a wired personal area network, a telephony network, and/or a wide area network (WAN). Such networking environments are commonplace in intranets, the Internet, offices, enterprise-wide computer networks and the like. In some embodiments, communication interface 112 may include logic configured to support direct memory access (DMA) transfers between memory 104 and other devices.

In a networked environment, program modules depicted relative to the hardware device 100, or portions thereof, may be stored in a remote storage device, such as, for example, on a server. It will be appreciated that other hardware and/or software to establish a communications link between the hardware device 100 and other devices may be used.

It should be understood that the arrangement of hardware device 100 illustrated in FIG. 1 is but one possible implementation and that other arrangements are possible. It should also be understood that the various system components (and means) defined by the claims, described below, and illustrated in the various block diagrams represent logical components that are configured to perform the functionality described herein. For example, one or more of these system components (and means) can be realized, in whole or in part, by at least some of the components illustrated in the arrangement of hardware device 100. In addition, while at least one of these components are implemented at least partially as an electronic hardware component, and therefore constitutes a machine, the other components may be implemented in software, hardware, or a combination of software and hardware. More particularly, at least one component defined by the claims is implemented at least partially as an electronic hardware component, such as an instruction execution machine (e.g., a processor-based or processor-containing machine) and/or as specialized circuits or circuitry (e.g., discrete logic gates interconnected to perform a specialized function), such as those illustrated in FIG. 1. Other components may be implemented in software, hardware, or a combination of software and hardware. Moreover, some or all of these other components may be combined, some may be omitted altogether, and additional components can be added while still achieving the functionality described herein. Thus, the subject matter described herein can be embodied in many different variations, and all such variations are contemplated to be within the scope of what is claimed.

In the description that follows, the subject matter will be described with reference to acts and symbolic representations of operations that are performed by one or more devices, unless indicated otherwise. As such, it will be understood that such acts and operations, which are at times referred to as being computer-executed, include the manipulation by the processing unit of data in a structured form. This manipulation transforms the data or maintains it at locations in the memory system of the computer, which reconfigures or otherwise alters the operation of the device in a manner well understood by those skilled in the art. The data structures where data is maintained are physical locations of the memory that have particular properties defined by the format of the data. However, while the subject matter is being described in the foregoing context, it is not meant to be limiting as those of skill in the art will appreciate that various of the acts and operation described hereinafter may also be implemented in hardware.

To facilitate an understanding of the subject matter described below, many aspects are described in terms of sequences of actions. At least one of these aspects defined by the claims is performed by an electronic hardware component. For example, it will be recognized that the various actions can be performed by specialized circuits or circuitry, by program instructions being executed by one or more processors, or by a combination of both. The description herein of any sequence of actions is not intended to imply that the specific order described for performing that sequence must be followed. All methods described herein can be performed in any suitable order unless otherwise indicated herein or otherwise clearly contradicted by context. In an embodiment, the computer system 100 includes one or more methods discovering snapshot information based on storage arrays.

In the prior art, an administrator of an enterprise's computer system may not be able to get information about the snapshots corresponding to a specific source that are stored on specific storage arrays of the enterprise. Embodiments herein enable discovering snapshot information based on storage arrays. An array profiler creates and enables the display a hybrid view of the storage administrators' views of snapshots stored on storage arrays, the backup administrator's view of snapshots stored on storage arrays, and additional information linking the storage administrators' views of snapshots stored on storage arrays with the backup administrator's view of snapshots stored on storage arrays.

Figure 2:
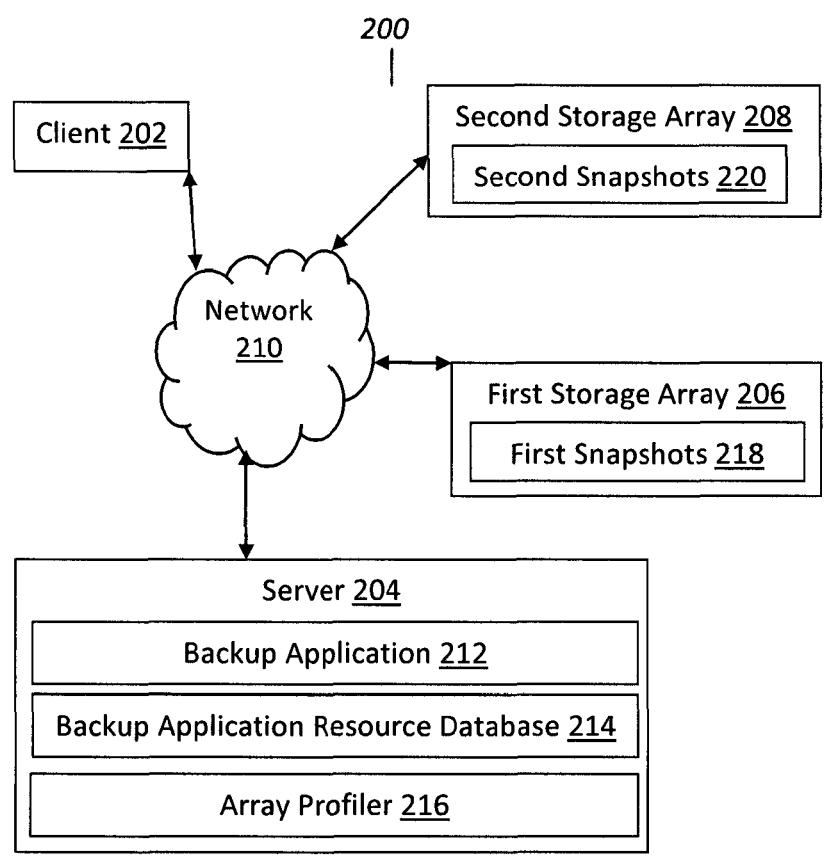
FIG. 2 illustrates a block diagram of an example system for discovering snapshot information based on storage arrays, under an embodiment.

FIG. 2 illustrates a block diagram of a system that implements discovering snapshot information based on storage arrays, under an embodiment. As shown in FIG. 2, system 200 may illustrate a cloud computing environment in which data, applications, services, and other resources are stored and delivered through shared data-centers and appear as a single point of access for the users. The system 200 may also represent any other type of distributed computer network environment in which servers control the storage and distribution of resources and services for different client users.

In an embodiment, the system 200 represents a cloud computing system that includes a client 202; and a server 204, a first storage array 206, and a second storage array 208 that may be provided by a hosting company. The first storage array 206 may be referred to as the VNX-5700 storage array 206 and the second storage array 208 may be referred to as the VMAX storage array 208. The client 202, the server 204, and the storage arrays 206-208 communicate via a network 210. Although FIG. 2 depicts the system 200 with one client 202, one server 204, two storage arrays 206-208, and one network 210, the system 200 may include any number of clients 202, servers 204, storage arrays 206-208, and networks 210. The client 202 and the server 204 may each be substantially similar to the system 100 depicted in FIG. 1.

The server 204 includes a backup application 212, a backup application resource database 214, and an array profiler 216, the VNX-5700 storage array 206 includes first snapshots 218, and the VMAX storage array 208 includes second snapshots 220. The backup application 212 creates the snapshots 218-220 of data sets or file systems on the client 202 and/or the server 204, stores the snapshots 218-220 on the storage arrays 206-208, and stores information about the snapshots 218-220 in the backup application resource database 214. FIG. 2 depicts the system elements 212-216 residing completely on the server 204, but the system elements 212-216 may reside completely on the server 204, completely on the client 202, completely on another server that is not depicted in FIG. 2, or in any combination of partially on the server 204, partially on the client 202, and partially on the other server.

The backup application 212 may be an EMC Corporation's NetWorker® backup application, which is a suite of enterprise level data protection software that unifies and automates backup to tape, disk-based, and flash-based storage media across physical and virtual environments for granular and disaster recovery. Cross-platform support is provided for many environments, including Microsoft Windows®. A central NetWorker® server manages a data zone that contains backup clients and NetWorker® storage nodes that access the backup media. The NetWorker® management console software provides a graphic user interface for functions such as client configuration, policy settings, schedules, monitoring, reports, and daily operations for deduplicated and non-deduplicated backups. The core NetWorker® software backs up client file systems and operating system environment. Add-on database and application modules provide backup services for products such as Microsoft® Exchange Server. Client backup data can be sent to a remote NetWorker® storage node or stored on a locally attached device by the use of a dedicated storage node. EMC Corporation's NetWorker® modules for Microsoft® applications supports Microsoft® products such as Microsoft® Exchange, Microsoft® Sharepoint, Microsoft® SQL Server, and Microsoft® Hyper-V servers.

Figure 3:
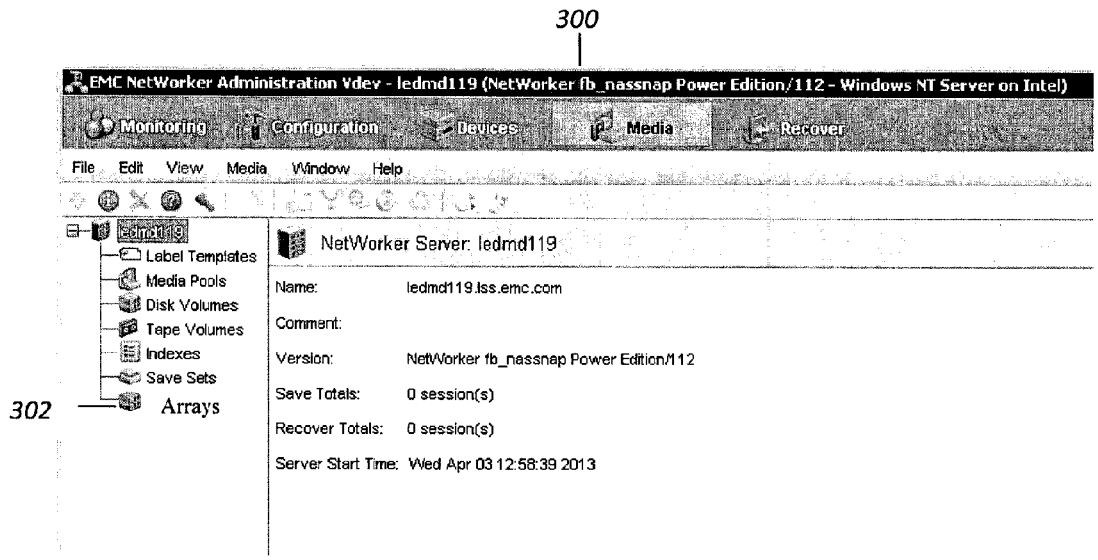
FIG. 3 is a screen shot illustrating a frame of an example user interface screen of a display device supporting methods for discovering snapshot information based on storage arrays, under an embodiment.

A system identifies first snapshot information associated with a first storage array. For example, the array profiler 216 executes a VNX-5700 application program interface provided by the vendor of the VNX-5700 storage array 206 to discover the array model, array names, array identifiers, snapshot types, number of snapshots, and logical unit identifiers for the source and the target for the first snapshots 218 stored on the VNX-5700 storage array 206. The frame 300 described below in reference to FIG. 3 is an example of a frame of a user interface that a system user can use to request snapshot information based on storage arrays.

Figure 4:
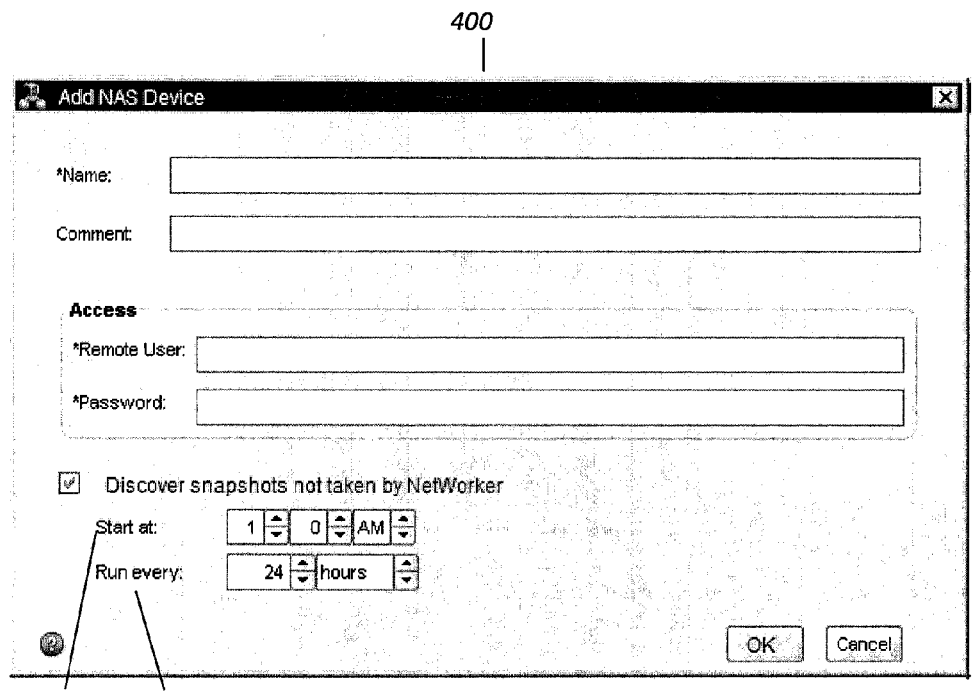
FIG. 4 is another screen shot illustrating a frame of an example user interface screen of a display device supporting methods for discovering snapshot information based on storage arrays, under an embodiment.

The system may identify a snapshot, determine whether the snapshot is registered by a backup application, and identify the snapshot as a foreign snapshot if the snapshot is not registered by the backup application. For example, the application profiler 216 discovers a specific snapshot of the first snapshots 218, and compares the metadata for the specific snapshot to a list of the metadata for snapshots created by the backup application 212, which is stored in the backup application resource database 214. If the list of the metadata for the snapshots created by the backup application 212 includes the metadata for the specific snapshot, then the array profiler 216 identifies the specific snapshot as a managed snapshot, which is a snapshot that was created by the backup application 212. If the list of the metadata for the snapshots created by the backup application 212 does not include the metadata for the specific snapshot, then the array profiler 216 identifies the specific snapshot as a foreign snapshot, which is a snapshot that was created by a storage administrator, and not created by the backup application 212. The frame 400 described below in reference to FIG. 4 is an example of a frame of a user interface that a system user can use to request identification of foreign snapshots.

The system identifies second snapshot information associated with a second storage array. For example, the array profiler 216 executes a VMAX application program interface provided by the vendor of the VMAX storage array 208 to discover the array model, array names, array identifiers, snapshot types, number of snapshots, and logical unit identifiers for the source and the target for the second snapshots 220 stored on the VMAX storage array 208.

The system outputs first snapshot information and second snapshot information via a user interface. For example, a user interface for the client 202 outputs the array models, array names, array identifiers, snapshot types, number of snapshots, and logical unit identifiers for the source and the target for snapshots 218-220 stored on the VNX-5700 and VMAX storage arrays 206-208. The frame 500 described below in reference to FIG. 5 is an example of a frame of a user interface that depicts the array models, array names, array identifiers, snapshot types, number of snapshots, and logical unit identifiers for the source and the target for the snapshots 218-220 stored on the VNX-5700 and VMAX storage arrays 206-208.

The system may delete a snapshot from a first storage array or a second storage array in response to a user request. For example, the array profiler 216 responds to a user request from a user interface that depicts snapshot information based on storage arrays by deleting one of the first snapshots 218 from the VNX-5700 storage array 206.

The system may store foreign snapshot information associated with a foreign snapshot to a database associated with a backup application. For example, the array profiler 216 stores the metadata for the identified foreign snapshot in the backup application resource database 214 with the metadata for the snapshots created by the backup application 212. Once the backup application resource database 214 has the metadata for the foreign snapshot, the backup application 212 can enable a system user to perform the following administrative tasks with the foreign snapshot: deletes, mounts, backups, rollbacks, cross-synchronizations, and expiration policy settings.

The system may enable a backup application to execute a rollback based on foreign snapshot information. For example, the array profiler 216 informs the backup application 212 that metadata for the identified foreign snapshot is stored in the backup application resource database 214 with the metadata for the snapshots created by the backup application 212, which enables the backup application 212 to process the identified foreign snapshot as if the backup application 212 created the identified foreign snapshot. In this example, the backup application 212 uses the identified foreign snapshot to roll back the current state of the client 202 to the state of the client 202 when the identified foreign snapshot was created to capture the state of the client 202.

The system may output foreign snapshot information in response to a user request based on a timestamp. For example, a system user requests the array profiler 216 to discover a foreign snapshot created of the client 202 in a specific date range when the backup application 212 created snapshots of the client 202, the array profiler 216 identifies such a foreign snapshot of the client 202, the array profile 216 stores the metadata for the foreign snapshot in the backup application resource database 214, and the system user labels the foreign snapshot as a snapshot that may be used to recover the state of the client 202 based on the date that the foreign snapshot was created. The user request may specify to discover all snapshots, discover only foreign snapshots, discover only managed snapshots, and discover foreign snapshots which have their metadata already imported to the backup application resource database 214. Rows of information in the response to the user query may display an option to import metadata for a foreign snapshot to the backup application resource database 214. After the system user selects the import option, the array profiler 216 registers the foreign snapshot with the backup application 212. The array profiler 216 creates and enables the display a hybrid view of the storage administrators' views of snapshots stored on the storage arrays 206-208, the backup administrator's view of snapshots stored on the storage arrays 206-208, and additional information linking the storage administrators' views of snapshots stored on the storage arrays 206-208 with the backup administrator's view of snapshots stored on the storage arrays 206-208.

FIG. 3 is a screen shot illustrating a frame of an example user interface screen of a display device supporting methods for discovering snapshot information based on storage arrays, under an embodiment. The frame 300 enables a system user to select the arrays 302 selector to discover storage arrays as devices in a similar manner to discovering target appliances as devices. Discovering storage arrays as devices enables the system user to add a storage array as a device and store information about the storage array in a database. Storage arrays may be discovered for a single data zone, which includes a backup server, any clients that use the backup server, and the storage arrays which the backup server uses within a sub-network. However, storage arrays may be discovered across multiple data zones, which include all backup servers, any clients that use the backup servers, and the storage arrays which the backup servers use within a system's network. The system user may select, such as by double-clicking on the arrays 302 selector, to view array details, such as array type, array identifiers, array models, what type of snapshots were created and how many of each type, how many active snapshots were created for file systems/save sets, and applicable save sets: file systems/applications. Unlike prior art systems, which depict storage arrays as sources and targets without depicting the storage arrays as a resource, thereby creating complexity and additional layers of abstractions, the frame 300 depicts storage arrays as resources, which enables system users to manage storage array information at a single point. The frame 500 described below in reference to FIG. 5 is an example of a frame of a user interface that depicts storage array information that the system depicts in response to a user selecting the arrays 302 selector.

FIG. 4 is another screen shot illustrating a frame of an example user interface screen of a display device supporting methods for discovering snapshot information based on storage arrays, under an embodiment. The frame 400 includes a start 402 selector and a run every 404 selector. A system user may select the start 402 selector to specify a start time to search for foreign snapshots and select the run every 404 selector to specify a time range for searching for foreign snapshots. The frame 400 enables a system user to request the array profiler 216 to discover a foreign snapshot created of the client 202 between specific dates when the backup application 212 created snapshots.

FIG. 5 is yet another screen shot illustrating a frame of an example user interface screen of a display device supporting methods for discovering snapshot information based on storage arrays, under an embodiment. The frame 500 includes a source host name 502 column, a file system 504 column, a mount host 506 column, an array name: array identifier 508 column, an array model 510 column, a snapshot type 512 column, a number of snapshots 514 column, a LUN (logical unit number) identifier source: target 516 column, and a creation type column 518. The frame 500 provides snapshot information based on arrays in an intuitive manner, which enables system users to easily identify the end to end options. The frame 500 depicts the foreign snapshots with the snapshots managed within the backup application 212, providing a common reference point that details all of the snapshots that are taken for a LUN/File system/storage array. The frame 500 enables a system user to discover and report on the foreign snapshots, while also providing any timestamp of when the foreign snapshots were imported to the backup application resource database 214. Instead of running operations at the save set level, the system user is enabled to perform operations at the storage arrays level. For example, the frame 500 enables a system user to delete specific snapshots, specific snapshot types, and/or all of the snapshots for a storage array. The system user may easily create custom reports based on the snapshot information, such as a breakdown of managed snapshots against foreign snapshots at the storage array level, at the logical unit number level, and at the file system level. A custom report based on timestamps may help identify trends of managed snapshots against foreign snapshots, compare storage arrays for a breakdown of snapshots taken, compare file systems/LUNs, offer a breakdown of different snapshot types and their mapping of managed snapshots against foreign snapshots. The frame 500 provides the system user with the required details to understand the amount of snapshots taken and the frequency of the snapshots so that this information may be factored in the actions required for meeting the recovery point objective and recovery time objective requirements.

Each of the frames 300, 400, and 500 may be part of a larger display screen that includes fields for users to enter commands to create, retrieve, edit, and store records. The system may output a display screen that includes any of the frames 300, 400, and 500 in response to a search based on search criteria input via a user interface. Because the frames 300, 400, and 500 are samples, the frames 300, 400, and 500 could vary greatly in appearance. For example, the relative sizes and positioning of the text is not important to the practice of the present disclosure. The frames 300, 400, and 500 can be depicted by any visual display, but are preferably depicted by a computer screen. The frames 300, 400, and 500 could also be output as a report and printed or saved in electronic format, such as PDF. The frames 300, 400, and 500 can be part of a personal computer system and/or a network, and operated from system data received by the network, and/or on the Internet. The frames 300, 400, and 500 may be navigable by a user. Typically, a user can employ a touch screen input to point-and-click to a location on any of the frames 300, 400, and 500 to manage the text on any of the frames 300, 400, and 500, such as a selection that enables a user to edit the text. The text depicted by the frames 300, 400, and 500 are examples, as the frames 300, 400, and 500 may include a much greater amount of text. The frames 300, 400, and 500 may also include fields in which a user can input textual information.

Figure 6:
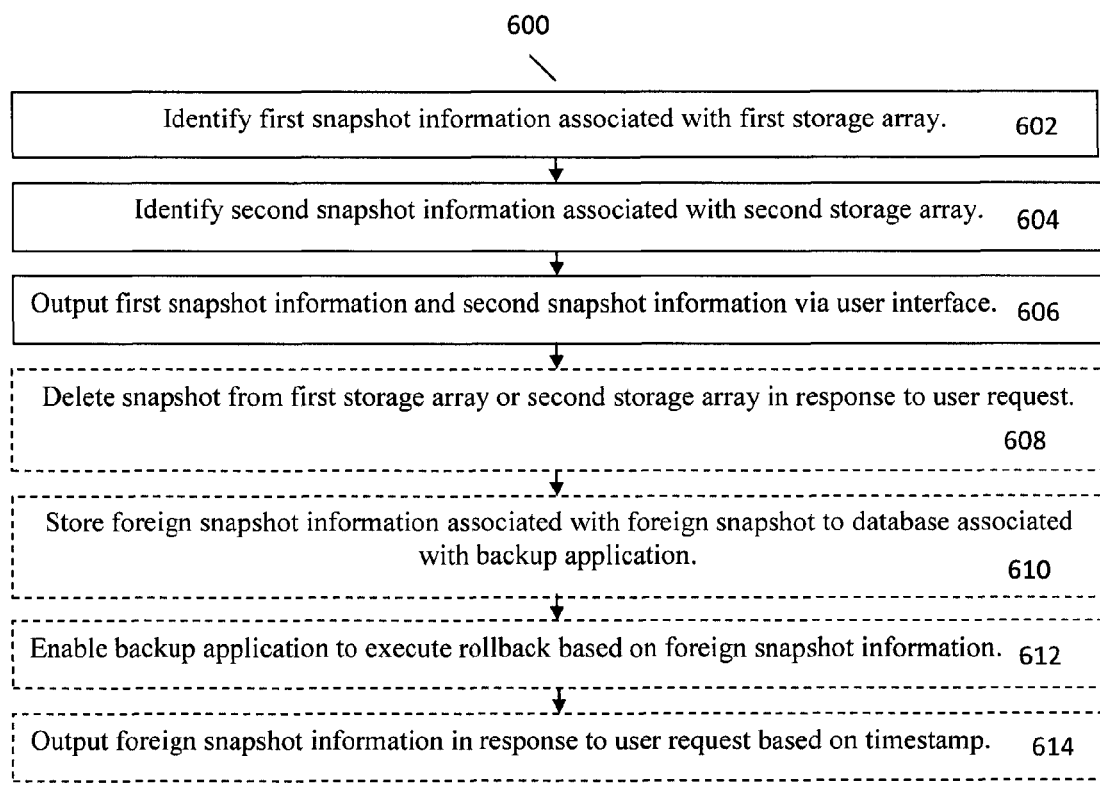
FIG. 6 is a flowchart that illustrates a method of discovering snapshot information based on storage arrays, under an embodiment.

FIG. 6 is a flowchart that illustrates a method of discovering snapshot information based on storage arrays. Flowchart 300 illustrates method acts illustrated as flowchart blocks for certain steps involved in and/or between the client 202 and/or the server 204 of FIG. 2.

First snapshot information associated with a first storage array is identified, act 602. For example, the array profiler 216 executes a VNX-5700 application program interface provided by the vendor of the VNX-5700 storage array 206 to discover the array model, array names, array identifiers, snapshot types, number of snapshots, and logical unit identifiers for the source and the target for the first snapshots 218 stored on the VNX-5700 storage array 206.

Second snapshot information associated with a second storage array is identified, act 604. For example, the array profiler 216 executes a VMAX application program interface provided by the vendor of the VMAX storage array 208 to discover the array model, array names, array identifiers, snapshot types, number of snapshots, and logical unit identifiers for the source and the target for the second snapshots 220 stored on the VMAX storage array 208.

First snapshot information and second snapshot information are output via a user interface, act 606. For example, a user interface for the client 202 outputs the array models, array names, array identifiers, snapshot types, number of snapshots, and logical unit identifiers for the source and the target for snapshots 218-220 stored on the VNX-5700 and VMAX storage arrays 206-208.

A snapshot is optionally deleted from a first storage array or a second storage array in response to a user request, act 608. For example, the array profiler 216 responds to a user request by deleting one of the first snapshots 218 from the VNX-5700 storage array 206.

Foreign snapshot information associated with a foreign snapshot is optionally stored to a database associated with the backup application, act 610. For example, the array profiler 216 stores the metadata for the identified foreign snapshot in the backup application resource database 214 with the metadata for the snapshots created by the backup application 212.

A backup application is optionally enabled to execute a rollback based on foreign snapshot information, act 612. For example, the array profiler 216 informs the backup application 212 that metadata for the identified foreign snapshot is stored in the backup application resource database 214 with the metadata for the snapshots created by the backup application 212, which enables the backup application 212 to process the identified foreign snapshot as if the backup application 212 created the foreign snapshot.

Foreign snapshot information is optionally output in response to a user request based on a timestamp, act 614. For example, a system user requests the array profiler 216 to identify a foreign snapshot created of the client 202 between two specific dates when the backup application 212 created snapshots of the client 202, the array profiler 216 identifies such a foreign snapshot of the client 202, the array profile 216 stores the metadata for the identified foreign snapshot in the backup application resource database 214, and the system user labels the identified foreign snapshot as a snapshot that may be used to recover the state of the client 202 based on the date that the identified foreign snapshot was created.

Although FIG. 6 depicts the acts 602-614 occurring in a specific order, the acts 602-614 may occur in another order. Executing the flowchart 600 enables discovering snapshot information based on storage arrays. The array profiler 216 creates and enables the display a hybrid view of the storage administrators' views of snapshots stored on the storage arrays 206-208, the backup administrator's view of snapshots stored on the storage arrays 206-208, and additional information linking the storage administrators' views of snapshots stored on the storage arrays 206-208 with the backup administrator's view of snapshots stored on the storage arrays 206-208.

The use of the terms "a" and "an" and "the" and similar referents in the context of describing the subject matter (particularly in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. Furthermore, the foregoing description is for the purpose of illustration only, and not for the purpose of limitation, as the scope of protection sought is defined by the claims as set forth hereinafter together with any equivalents thereof entitled to. The use of any and all examples, or exemplary language (e.g., "such as") provided herein, is intended merely to better illustrate the subject matter and does not pose a limitation on the scope of the subject matter unless otherwise claimed. The use of the term "based on" and other like phrases indicating a condition for bringing about a result, both in the claims and in the written description, is not intended to foreclose any other conditions that bring about that result. No language in the specification should be construed as indicating any non-claimed element as essential to the practice of the invention as claimed.

Preferred embodiments are described herein, including the best mode known to the inventor for carrying out the claimed subject matter. Of course, variations of those preferred embodiments will become apparent to those of ordinary skill in the art upon reading the foregoing description. The inventor expects skilled artisans to employ such variations as appropriate, and the inventor intends for the claimed subject matter to be practiced otherwise than as specifically described herein. Accordingly, this claimed subject matter includes all modifications and equivalents of the subject matter recited in the claims appended hereto as permitted by applicable law. Moreover, any combination of the above-described elements in all possible variations thereof is encompassed unless otherwise indicated herein or otherwise clearly contradicted by context.

What is claimed is:

1. A system for discovering snapshot information based on storage arrays, each storage array comprising a disk storage system containing a plurality of disk drives, the system comprising:
   a processor-based application executed on a computer and configured to:
   identify first snapshot information associated with a first storage array by executing an application program interface associated with the first storage array to discover data associated with each snapshot of a plurality of snapshots stored on the first storage array, wherein at least one snapshot of the plurality of snapshots is a foreign snapshot;
   identify second snapshot information associated with a second storage array by executing an application program interface associated with the second storage array to discover data associated with each snapshot of a plurality of snapshots stored on the second storage array, the application program interface associated with the second storage array being different from the application program interface associated with the first storage array; and
   output the identified first snapshot information and the identified second snapshot information via a user interface.

2. The system of claim 1, wherein at least one of the first snapshot information and the second snapshot information comprises a source host name, a file system identifier, a storage array identifier, a storage array model, a snapshot type, a number of snapshots, a logical unit number of a snapshot source, a logical unit number of a snapshot target, a foreign snapshot designation, and a timestamp.

3. The system of claim 1, wherein the processor-based application is further configured to delete a snapshot from one of the first storage array and the second storage array in response to a user request.

4. The system of claim 1, wherein identifying the first snapshot information comprises:
   identifying a snapshot;
   determining whether the snapshot is registered by a backup application; and
   identifying the snapshot as the foreign snapshot in response to a determination that the snapshot is not registered by the backup application.

5. The system of claim 4, wherein the processor-based application is further configured to store foreign snapshot information associated with the foreign snapshot to a database associated with the backup application.

6. The system of claim 5, wherein the processor-based application is further configured to enable the backup application to execute a rollback based on the foreign snapshot information.

7. The system of claim 5, wherein the processor-based application is further configured to output the foreign snapshot information in response to a user request based on a timestamp.

8. A computer-implemented method for discovering snapshot information based on storage arrays, each storage array comprising a disk storage system containing a plurality of disk drives, the method comprising:
   identifying first snapshot information associated with a first storage array by executing an application program interface associated with the first storage array to discover data associated with each snapshot of a plurality of snapshots stored on the first storage array, wherein at least one snapshot of the plurality of snapshots is a foreign snapshot;
   identifying second snapshot information associated with a second storage array by executing an application program interface associated with the second storage array to discover data associated with each snapshot of a plurality of snapshots stored on the second storage array, the application program interface associated with the second storage array being different from the application program interface associated with the first storage array; and outputting the identified first snapshot information and the identified second snapshot information via a user interface.

9. The method of claim 8, wherein at least one of the first snapshot information and the second snapshot information comprises a source host name, a file system identifier, a storage array identifier, a storage array model, a snapshot type, a number of snapshots, a logical unit number of a snapshot source, a logical unit number of a snapshot target, a foreign snapshot designation, and a timestamp.

10. The method of claim 8, wherein the method further comprises deleting a snapshot from one of the first storage array and the second storage array in response to a user request.

11. The method of claim 8, wherein identifying the first snapshot information comprises:
identifying a snapshot;
determining whether the snapshot is registered by a backup application; and
identifying the snapshot as the foreign snapshot in response to a determination that the snapshot is not registered by the backup application.

12. The method of claim 11, wherein method further comprises storing foreign snapshot information associated with the foreign snapshot to a database associated with the backup application.

13. The method of claim 12, wherein the method further comprises enabling the backup application to execute a rollback based on the foreign snapshot information.

14. The method of claim 12, wherein the method further comprises outputting the foreign snapshot information in response to a user request based on a timestamp.

15. A computer program product, comprising a non-transitory computer-readable medium having a computer-readable program code embodied therein to be executed by one or more processors, the program code including instructions to:
identify first snapshot information associated with a first storage array by executing an application program interface associated with the first storage array to discover data associated with each snapshot of a plurality of snapshots stored on the first storage array, wherein at least one snapshot of the plurality of snapshots is a foreign snapshot;
identify second snapshot information associated with a second storage array by executing an application program interface associated with the second storage array to discover data associated with each snapshot of a plurality of snapshots stored on the second storage array, the application program interface associated with the second storage array being different from the application program interface associated with the first storage array, each storage array comprising a disk storage system containing a plurality of disk drives; and
output the identified first snapshot information and the identified second snapshot information via a user interface.

16. The computer program product of claim 15, wherein at least one of the first snapshot information and the second snapshot information comprises a source host name, a file system identifier, a storage array identifier, a storage array model, a snapshot type, a number of snapshots, a logical unit number of a snapshot source, a logical unit number of a snapshot target, a foreign snapshot designation, and a timestamp.

17. The computer program product of claim 15, wherein the program code includes further instructions to delete a snapshot from one of the first storage array and the second storage array in response to a user request.

18. The computer program product of claim 15, wherein identifying the first snapshot information comprises:
identifying a snapshot;
determining whether the snapshot is registered by a backup application; and
identifying the snapshot as the foreign snapshot in response to a determination that the snapshot is not registered by the backup application.

19. The computer program product of claim 18, wherein the program code includes further instructions to store foreign snapshot information associated with the foreign snapshot to a database associated with the backup application.

20. The computer program product of claim 18, wherein the program code includes further instructions to:
enable the backup application to execute a rollback based on the foreign snapshot information; and
output the foreign snapshot information in response to a user request based on a timestamp.

* * * * *